United States Patent [19]
Cloutier et al.

[11] Patent Number: 5,805,602
[45] Date of Patent: Sep. 8, 1998

[54] NETWORK MONITORING SYSTEM FOR CELL DELAY VARIATION

[75] Inventors: Leo Cloutier, Bethesda; David C. Curtis; Kathleen P. Curtis, both of Crofton; David D. DeNunzio, Ellicott City, all of Md.; William P. Reed, Haddonfield, N.J.; Robert A. Wolak, Audubon, Pa.

[73] Assignee: Bell Atlantic Network Services, Inc., Arlington, Va.

[21] Appl. No.: 725,653

[22] Filed: Oct. 1, 1996

Related U.S. Application Data

[63] Continuation of Ser. No. 651,297, May 22, 1996, which is a continuation-in-part of Ser. No. 616,037, Mar. 14, 1996, which is a continuation-in-part of Ser. No. 533,501, Sep. 25, 1995.

[51] Int. Cl.⁶ ..................................................... H04J 3/06
[52] U.S. Cl. ........................................... 370/516; 348/497
[58] Field of Search ..................................... 370/474, 476, 370/395, 397, 503, 506, 508, 516, 517, 519; 375/371, 372; 348/423, 474, 500, 432, 434, 497

[56] References Cited

U.S. PATENT DOCUMENTS

| | | |
|---|---|---|
| 4,716,575 | 12/1987 | Douros et al. . |
| 4,894,823 | 1/1990 | Adelmann et al. . |
| 4,984,264 | 1/1991 | Katsube . |
| 5,127,000 | 6/1992 | Henrion . |
| 5,153,578 | 10/1992 | Izawa et al. . |
| 5,229,998 | 7/1993 | Weisser . |
| 5,247,347 | 9/1993 | Litteral . |
| 5,247,464 | 9/1993 | Curtis . |
| 5,260,978 | 11/1993 | Fleischer et al. .................... 375/113 |
| 5,285,446 | 2/1994 | Yonehara . |
| 5,323,389 | 6/1994 | Bitz et al. . |
| 5,381,181 | 1/1995 | Deiss . |
| 5,390,184 | 2/1995 | Morris . |
| 5,394,395 | 2/1995 | Nagai et al. . |
| 5,396,497 | 3/1995 | Veltman . |
| 5,432,713 | 7/1995 | Takeo et al. .......................... 364/569 |
| 5,452,010 | 9/1995 | Doornink .............................. 348/715 |
| 5,467,342 | 11/1995 | Logston et al. . |
| 5,473,385 | 12/1995 | Leske .................................... 348/464 |
| 5,533,021 | 7/1996 | Branstand et al. .................... 348/512 |
| 5,565,924 | 10/1996 | Haskell et al. ........................ 375/371 |
| 5,668,841 | 9/1997 | Haskell et al. ........................ 370/516 |

FOREIGN PATENT DOCUMENTS

| | | |
|---|---|---|
| 3-114333(A) | 5/1991 | Japan . |
| 4-123549 | 4/1992 | Japan . |
| 4-207435 | 7/1992 | Japan . |
| 5-37560 | 2/1993 | Japan . |

*Primary Examiner*—Ajit Patel
*Attorney, Agent, or Firm*—McDermott, Will & Emery

[57] ABSTRACT

An arrangement (apparatus and method) for monitoring jitter caused during transport of digitally-coded information in a packet switched network, and for managing network operations in accordance with the detected jitter. The detected jitter is used to determine whether corrective action is necessary, such as rerouting network traffic, or performing network maintenance. The disclosed arrangement detects program clock reference (PCR) values from an MPEG-encoded transport stream, whereby each pair of PCR values represents an expected arrival time of a corresponding stream segment. An actual arrival time for the corresponding stream segment is determined in response to detection of the corresponding PCR values and an independent clock signal. The expected arrival time of the stream segment and the actual arrival time are correlated with an accumulation of expected and actual arrivaimes of previously-received data packet stream segments in order to determine the jitter in the digital data stream. The jitter is corrected by a combination of adaptive buffering techniques and restamping the PCR value with corrected values coinciding with the actual arrival time of the stream segments.

50 Claims, 10 Drawing Sheets

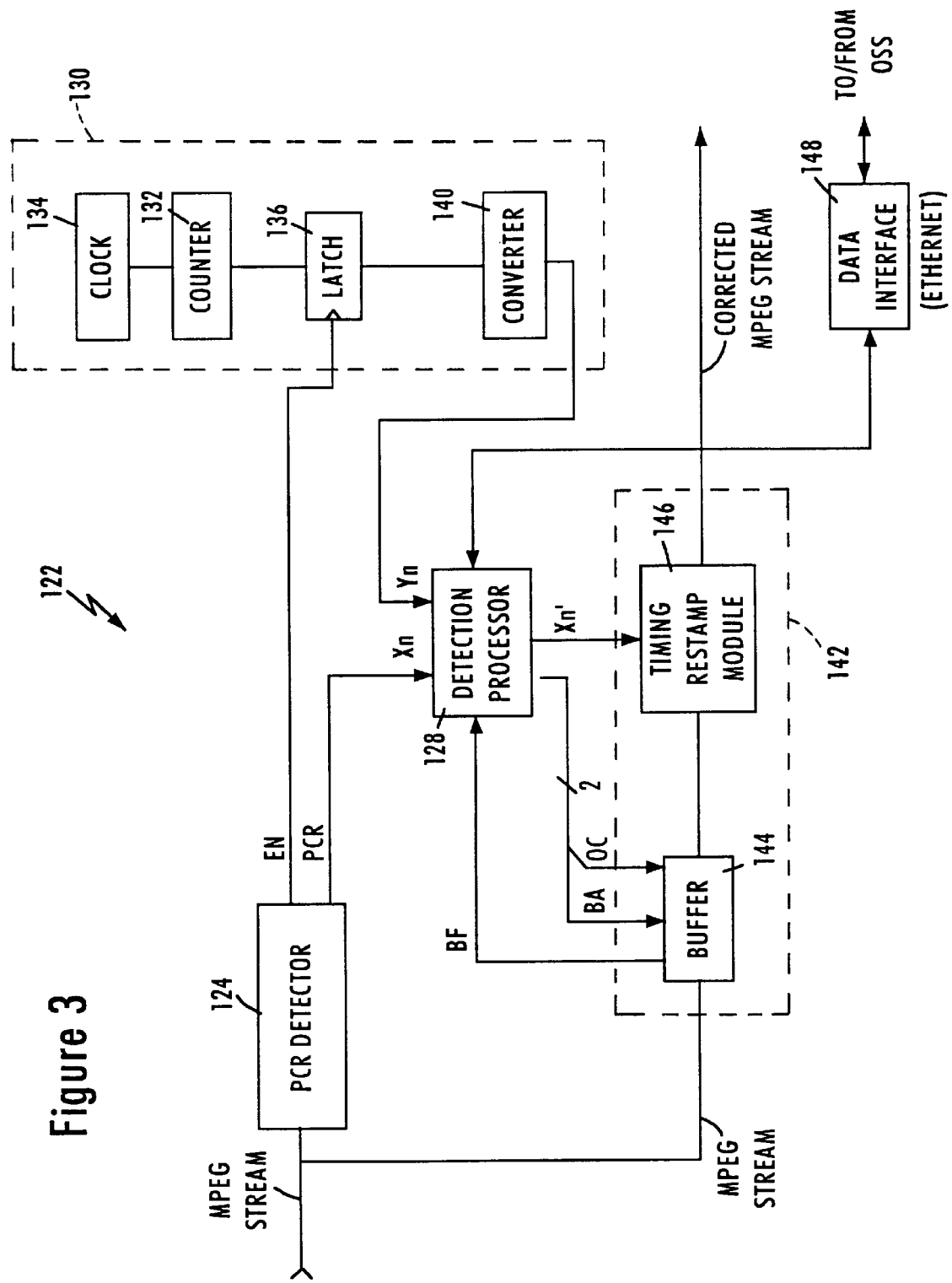

NETWORK MONITORING SYSTEM FOR CELL DELAY VARIATION

RELATED APPLICATIONS

This is a continuation of application Ser. No. 08/651,297, filed May 22, 1996, which is a continuation-in-part of application Ser. No. 08/616,037, filed Mar. 14, 1996, which is a continuation-in-part of application Ser. No. 08/533,501, filed Sept. 25, 1995, the disclosures of which are incorporated in their entirety by reference.

TECHNICAL FIELD

The present invention relates to network monitoring devices used to monitor timing errors created during transport of digital information through packet switched networks such as Asynchronous Transfer Mode (ATM) networks.

BACKGROUND ART

There is a trend in the communications industries to develop digital systems that provide more efficient transmission of information. This development is found in digital cellular telephone systems, facsimile transmission systems, data networking systems, and video distribution systems. A number of systems have recently been proposed for distributing information in digital data form using Asynchronous Transfer Mode (ATM) technology.

ATM technology has been designed with the intention of providing service for a wide variety of applications such as voice, video, and data. Each of these applications has different service requirements in terms of cell loss, time delay, and cell delay variation. For example, voice traffic can withstand a small amount of cell loss, but it is rather intolerant to time delay and cell delay variation. Due to the asynchronous statistical nature of ATM, voice traffic must be smoothed at the receiver end in order to eliminate any accumulated cell delay variation incurred in the network. The requirements for video traffic are somewhat dependent upon coding and compression schemes. These coding schemes can produce either constant bit-rate or variable bit-rate traffic. Data services can withstand a considerable amount of time delay and cell delay variation, but cannot lose any information, or else retransmission is required. Video traffic can typically tolerate a small amount of cell loss, however, it is sensitive to time delay and cell delay variation, and asynchronous transport of video creates a number of problems as discussed more fully below.

Various wideband digital distribution networks have been proposed for offering subscribers an array of video services, including true Video On Demand Service. Such wideband distribution networks transport digitized, compressed video program information supplied from a video headend in order to improve transport efficiency. For example, MPEG (moving picture experts group) is a broad generic standard for digital video program compression. A number of specific compression algorithms satisfy MPEG requirements. MPEG-2 is a second generation compression standard capable of encoding video program material into a 6 Mbits/sec bit stream and packetizing a number of 6 Mbits/sec channel streams into a single higher rate signal transport stream.

At the subscriber premises, the digital compressed program stream transported by the wideband digital distribution networks must be recovered in order to provide the video information to video display systems for displaying the video information to the subscribers. Unlike a computer data file composed of data downloaded from a remote server for use in a local computer, certain applications such as voice reproduction and presentation of animated video requires synchronous presentation in order to provide intelligible information to the user. Video data, by definition, consists of "real-time" information, requiring synchronization of the encoding and decoding processes to ensure accurate real-time reproduction for viewing. Various MPEG receiver systems have been developed to synchronize MPEG decoders to a received MPEG-encoded stream. Basic MPEG receiver systems synchronize internal clocks to received time stamp values, known as Program Clock Reference (PCR) values, by sampling the PCR values, calculating the difference between the sampled PCR values and counted internal clock values (C) between PCR samples to obtain an error signal, and outputting an error signal to the internal clock to synchronize the internal clock according to the calculated difference.

U.S. Pat. No. 5,396,497 to Veltman discloses an MPEG-1 demultiplexer/decoder including a clock producing a time reference, and a demultiplexing switch separating a composite data stream into audio sample batches, audio time stamps, video frames, and video time stamps. The disclosed demultiplexer/decoder also includes an audio phase locked loop that produces an audio timing signal in response to the audio time stamps and time reference, and a video phase-locked loop that produces a video timing signal in response to the video time stamps and the timing signal. The audio timing signal and the video timing signal are supplied to audio and video decoders, respectively. Data packets in the MPEG I stream, referred to as a system clock reference (SCR), are used to control the transfer data rate in the decoder. The SCR is used during initialization of the device in order to synchronize the phase-locked loops with the respective data streams.

U.S. Pat. No. 5,381,181 to Deiss discloses a clock recovery apparatus for an MPEG-1 decoded signal. According to Deiss, the receiver comprises a counter, responsive to a controlled receiver clock signal, that is sampled at the arrival of a count value embedded in the MPEG transport layer. The differences of successive sampled count values from the receiver counter are compared with the differences of corresponding successive values of the MPEG count value in the MPEG transport layer to provide a signal to control the receiver clock signal.

FIG. 1 is a simplified block diagram of the clock recovery apparatus disclosed in Deiss. The clock recovery apparatus comprises a PCR detector 10 that receives a MPEG-1-encoded data stream. The MPEG stream comprises count values, denoted program clock references (PCR), embedded as auxiliary data within the transport packets. As disclosed in Deiss, these PCRs are supplied during encoding of the video signal as presentation time stamps in order to provide lip synchronization of associated audio and video information at the receiver.

The PCR detector 10 produces a control pulse 10a to a counter 12 upon the detection of a PCR value in the data stream. The counter 12 is driven by a voltage controlled oscillator (VCXO) 14. Upon receiving the control pulse 10a, the counter 12 outputs the count value to a subtraction circuit 16, and resets itself to restart counting modulo $2^{30}$ in response to the count pulses from the VCXO 14. The subtractor 16 calculates an error signal (E) in response to the differences between the detected PCR values from the MPEG stream and the counted values (L) latched from the counter 12. Thus, according to Deiss, the error signal E is calculated by the subtractor 16 according to the following equation:

$$E=|PCR_n-PCR_{n-1}|-|L_n-L_{n-1}|$$

The calculated error signal E is passed through a low pass filter 18 and then applied to the VCXO 14, designed to operate substantially at 27 MHz. The error signal E is utilized to condition the voltage controlled oscillator 14 to a frequency tending to equalize the differences between the counted values output by the counter 12 and the detected PCR values from the MPEG stream to enable the MPEG stream to be decoded by the MPEG decoder 20. Thus, Deiss contemplates adjusting the system clock to synchronize with the detected PCR stream.

As disclosed in Deiss, the digital video signal transmission arrangement generates presentation time stamps (PTRs) in response to a fixed frequency 27 MHz clock in the encoder. In addition, the receiver system of Deiss is intended to perform the inverse function of the encoder and transmitting modem at the transmitting headend. As such, Deiss assumes that there is no differential delay in the transport of the MPEG encoded stream, such that the detected PCR values at the receiver end represent an interarrival time corresponding to the interdeparture time defined by the system clock at the encoder.

However, attempts to improve the core switching, multiplexing and transmission technologies in integrated digital networks for transport of voice, data and video services to multiple users may cause differential delays in the transport of the digital data. ATM provides broad-bandwidth, low delay, packet switching and multiplexing at speeds of 1.544 Mbit/s to 1.2 gigabits per second (Gbit/s), whereby usable capacity can be assigned dynamically (on demand) by allocating bandwidth capacity to fixed-sized information-bearing units called "cells". Each cell contains header and information fields. The ATM standard, CCITT.121/2 specifies a 53 byte cell which includes a 5 byte header and a 48 byte payload.

The conversion of MPEG-2 data into ATM cell format, however, may impose differential timing delays due to the transport of the ATM cells throughout the network. The "asynchronous" nature of ATM causes timing problems in reception and reproduction of certain types of broadband information.

Further, certain transmission protocols may require a stream of continuous data. Thus, an ATM data stream carrying MPEG video data may need to be padded with ATM idle cells, or "dummy cells", in order to ensure proper synchronization with the physical layer. Adding such idle cells may create delays between the ATM cells carrying the respective PCR values of the MPEG stream. Moreover, delays in the ATM cell stream are introduced each time an ATM cell stream passes through an ATM switch. Finally, different ATM cell streams may be multiplexed together to improve transport efficiency in the broadband network. For example, commonly-assigned, copending application Ser. No. 08/380,744, filed Jan. 31, 1995, entitled "Full Service Network Using Asynchronous Transfer Mode Multiplexing" (attorney ref: 680-109), the disclosure which is incorporated in its entirety by reference, discloses an ATM edge device which is used to multiplex a plurality of ATM cells from different input sources onto a reduced number of output paths by combining the cell streams from the different sources.

The delay imposed by each of these different ATM processes varies over time, for example as a function of the data rates of input cells and resultant loading on each ATM processing device. For such reasons, the delay imposed on one cell in a particular stream may vary with respect to the next cell in the same stream.

Thus, an ATM cell stream passing through different ATM network components undergoes cell delay variation, whereby the cell transport rate at a receiving end is different than the cell transport rate at the transmitting end. In other words, ATM transport of MPEG-encoded information causes a variation in the interarrival time between the MPEG packets carried by the ATM cells. The cell delay variation may create a delay on the order of one millisecond, causing the synchronous payload data within the received ATM cell stream to lose the data rate originally output at the transmitting end before conversion to an ATM cell stream. Thus, the reconstructed MPEG stream may have PCR values that do not accurately reflect the interarrival time for the MPEG stream segment due to the differential delay caused by the cell delay variation. Thus, transport through an ATM network creates jitter in the MPEG stream caused by cell delay variation ATM cells carrying the MPEG stream.

As discussed above, the prior art receiver systems assume no differential delay in the PCR values stored in the MPEG stream and assure a uniform, constant delay between data packets. Thus, these prior art systems would be unable to compensate for jitter in the received MPEG stream. Moreover, the jitter in the received MPEG stream in FIG. 1 may cause a miscalculation in the error signal (E) supplied to the VCXO 14, resulting in a loss of synchronization. Thus, any jitter in a received MPEG stream would result in a degradation in receiver performance.

Moreover, a data stream passing through an ATM network receives additional cell delay variation each time the data stream passes through another network component (also referred to as network element or network node), such as an ATM switch. As networks become more complex, data streams may have a greater tendency to reach an unacceptable level of cell delay variation unless the cell delay variation at each node is carefully monitored. Further, the amount of cell delay variation may increase as the performance of a network node deteriorates over time due to hardware or software failures, or traffic overload.

DISCLOSURE OF THE INVENTION

In view of the foregoing, there is a need for an arrangement (apparatus and method) for measuring jitter in a transport stream of digitally coded data packets carrying time stamp values at regular intervals, such as MPEG-encoded data packets carrying PCR values.

There is also a need for an arrangement (apparatus and method) for minimizing jitter caused during transport of a data packet stream through a packet switched network.

There is also a need for an arrangement (apparatus and method) for monitoring timing errors in an MPEG stream due to cell delay variation generated during transport through a node of an asynchronous transfer mode (ATM) network.

There is also a need for a network performance monitoring system that determines faulty or marginally performing network components in a broadband ATM network. For example, there is a need for a network monitoring system that identifies network components that introduce an unacceptable level of cell delay variation due to network component failure, heavy traffic loading, etc.

There is also a need for a network performance monitoring system that can reroute data traffic from network paths having heavy traffic or marginally performing network components to alternate paths in response to detected cell delays at respective node locations.

There is also a need for a network converter for converting a data stream of ATM cells carrying MPEG-encoded data into an MPEG-encoded packet stream and monitoring the jitter in the MPEG-encoded packet stream. Such a converter may be implemented, for example, in an ATM demultiplexer for receiving a plurality of ATM cell streams and outputting a plurality of recovered MPEG packet streams having corrected PCR values.

There is also a need for an operations monitoring subnetwork that comprises a plurality of cell delay variation monitors (CDVM's) distributed throughout different points of an ATM network, each CDVM reporting the detected differential delay to a central control center that performs network operations including initiating corrective action to minimize the detected differential delay.

These and other needs are met by the present invention, in which an arrangement is disclosed for detecting cell delay variation, also referred to as jitter, at a variety of different points in an asynchronous network in order to maintain network operations. The jitter is detected by measuring cell delays in cell streams carrying data packets that include time stamp reference values at regular interval portions within the data stream. The detected jitter, which may be caused during transport in an asynchronous network, can be monitored at the different network locations to measure performance of the network elements as well as the overall network. The detected jitter may also be used to identify faulty performance of a network element, and to initiate corrective measures if the detected jitter exceeds a predetermined threshold. For example, the logical data paths of network traffic may be rerouted to reduce cell delay variation in an over-utilized network element, or service personnel may be dispatched to repair or replace defective components that are introducing excess cell delay variation. The detected jitter may also be minimized by modifying the data stream at the detection site to provide a data packet stream having correct time stamp values.

According to one aspect of the present invention, a method for measuring jitter in a transport stream of digitally-compressed data packets, such as MPEG-encoded data packets, includes the steps of detecting program clock reference (PCR) values from the transport stream, each PCR value identifying an expected arrival time of a corresponding portion of the transport stream, identifying an actual arrival time for each portion of the transport stream in accordance with a clock signal independent from the transport stream, and calculating the jitter based on a correlation of the corresponding expected and actual arrival times with an accumulation of respective expected and actual arrival times of prior portions of the transport stream. The detected jitter may be reported to a central station or control center which initiates corrective action in response to the reported jitter.

In another aspect of the present invention, the actual interarrival time for the corresponding data packet stream segment is determined independent from the detected time stamp values located within the data packet stream. Whereas the prior art measured interarrival time by counting pulses from a voltage controlled oscillator having a data rate controlled by the received time stamp values, the present invention measures the actual interarrival time using a time clock source that is independent from the data transport streams received from the network, and as such is unaffected by any jitter or cell delay variation that may influence the transport of a data packet stream. As a result, the independent clock source does not suffer any synchronization problems due to any jitter or cell delay variation that may be present in a received data packet stream. Thus, the present invention is able to detect any jitter which may be created during network transport, for example, cell delay variation generated during transport in an asynchronous transfer mode (ATM) network.

The present invention uses the above-described method of detecting jitter to maintain network operations in the ATM network. Specifically, an operations monitoring subnetwork monitors the detected jitter at a plurality of locations in the ATM network to monitor network element performance and to maintain the operations of the ATM network. The operations monitoring network includes a plurality of cell delay variation monitors for detecting cell delay variations at respective nodes of the ATM network, an operations and support system (OSS) for managing operations of the network nodes, and a data network for supplying the detected cell delay variations from the corresponding cell delay variation monitor to the operations and support system and for providing configuration data to the network nodes in accordance with the detected cell delay variations supplied by the data network. The OSS uses the detected cell delay variations to monitor the performance of the corresponding network nodes, as well as the performance of the overall network, and to perform any necessary corrective action in response to the detected cell delay variations. Thus, the present invention provides an arrangement to maintain network reliability and performance on the basis of the transport of data throughout the network.

In addition, the OSS may perform corrective action on the detected jitter by activating a data packet stream correction circuit at the corresponding network node to output the received data packet stream as a corrected data packet stream having time stamps substantially coinciding with the actual time duration of the corresponding data packet stream segment of the corrected data packet stream. Thus, the detected jitter may be corrected such that the time stamps correctly identify the expected interarrival time and the actual time duration of the corresponding data packet stream segment.

For example, the detected jitter may be corrected by restamping the PCR fields of MPEG packets with corrected PCR values that compensate for the jitter. Alternatively, the detected jitter may be corrected using buffering techniques, such as modifying the spacing between data packets exiting the buffer, or modifying the output data rate of the buffered packet stream to compensate for the detected jitter.

Thus, the present invention ensures reliable reception, synchronization and decoding of a data packet stream by minimizing jitter caused during transport of the data packet stream. Moreover, the present invention enables network operations and maintenance on the basis of detected cell delay variations, thereby ensuring network reliability. These and other advantages of the present invention will become more readily apparent upon a review of the following detailed description and the attached claims.

BRIEF DESCRIPTION OF THE DRAWINGS

Reference is made to the attached drawings, wherein elements having the same reference numeral designations represent like elements throughout, and wherein:

FIG. 3 is a block diagram of a jitter detection device in accordance with a preferred embodiment of the present invention.

BEST MODE FOR CARRYING OUT THE INVENTION

The present invention provides detection of jitter in a packet switched network carrying streams of data packets each including time stamp values at regular intervals representing the expected arrival time of the respective segments of the data packet stream. Information on the detected jitter is supplied to a network control center, responsible for network operations, that determines whether traffic rerouting or network maintenance/repair is necessary based on the detected jitter. In addition, the network control center may activate a jitter correction circuit to correct the detected jitter at the corresponding node. A description will first be provided of an ATM network architecture and an exemplary encoding system at a video headend that outputs a data stream to the ATM network, followed by a preferred implementation of the invention for minimizing jitter created during transport through the distribution network.

The present invention is directed to the monitoring of jitter generated during transport in a packet switched network such as an ATM network. As recognized in the art, the term jitter refers to time deviations or delays in the actual data rate of a received data packet compared to the expected data rate. The time deviations are typically created during switching and multiplexing operations in the network. Thus, the data rate of a packet stream after transport on the network is different than the original data rate of the packet stream before transport. Such time deviations are present in networks using asynchronous transport mode (ATM) technology, and in such networks the time deviations are referred to as cell delay variations.

Figure 2A:
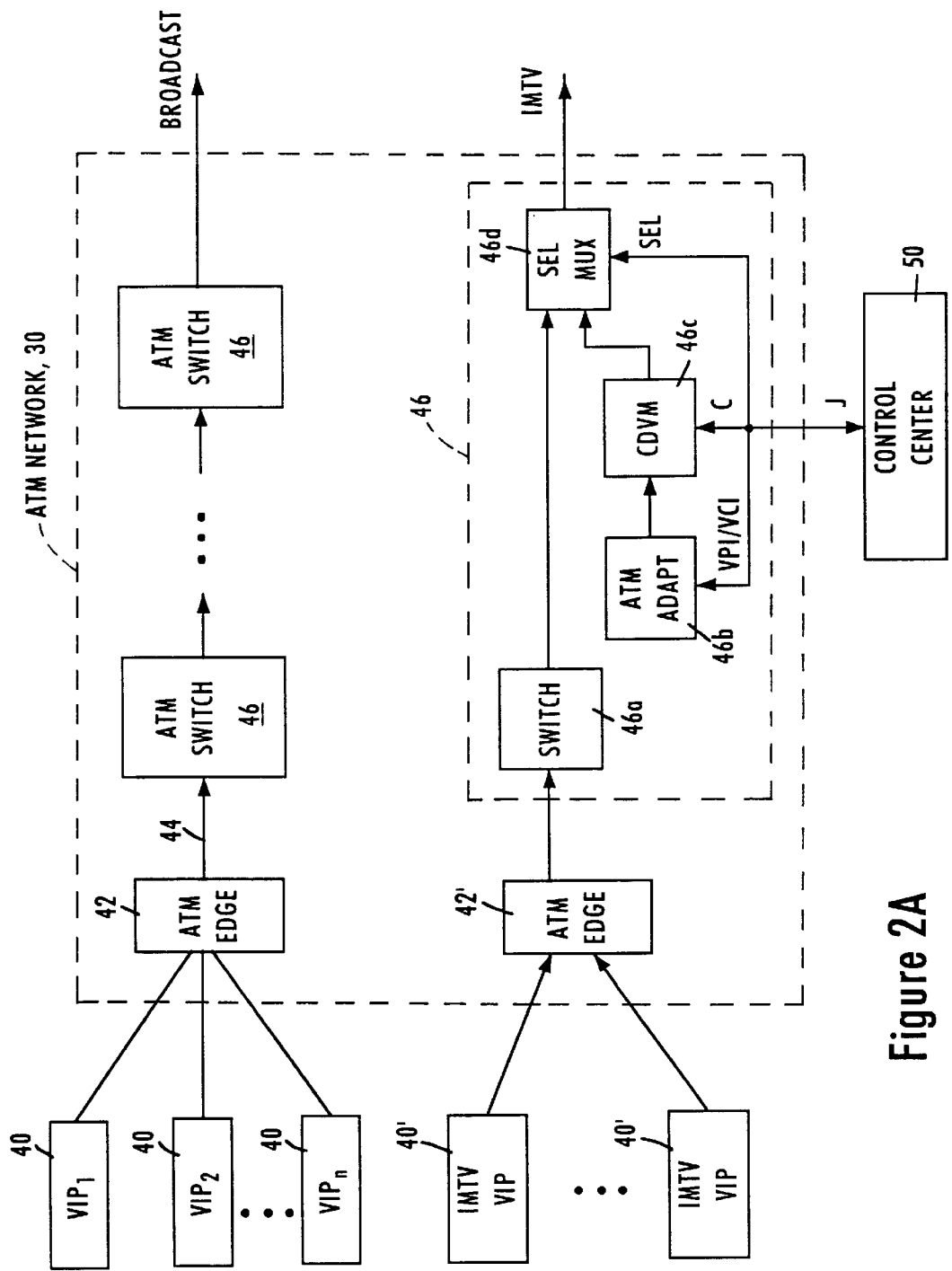
FIGS. 2A, 2B and 2C are block diagrams of a packet switched network using a system for monitoring and correcting jitter in accordance with the present invention.
Figure 2B:
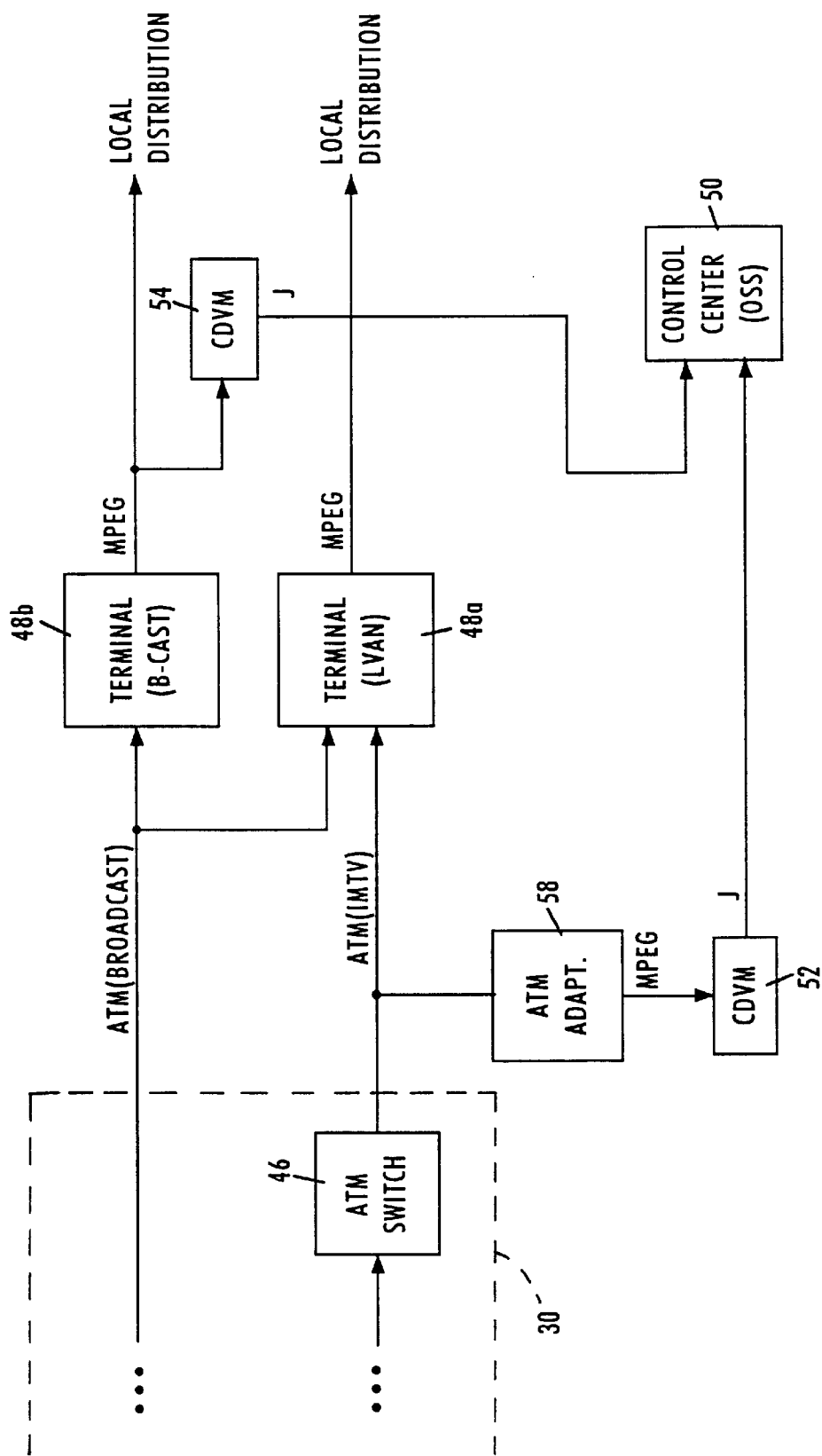
Figure 2C:
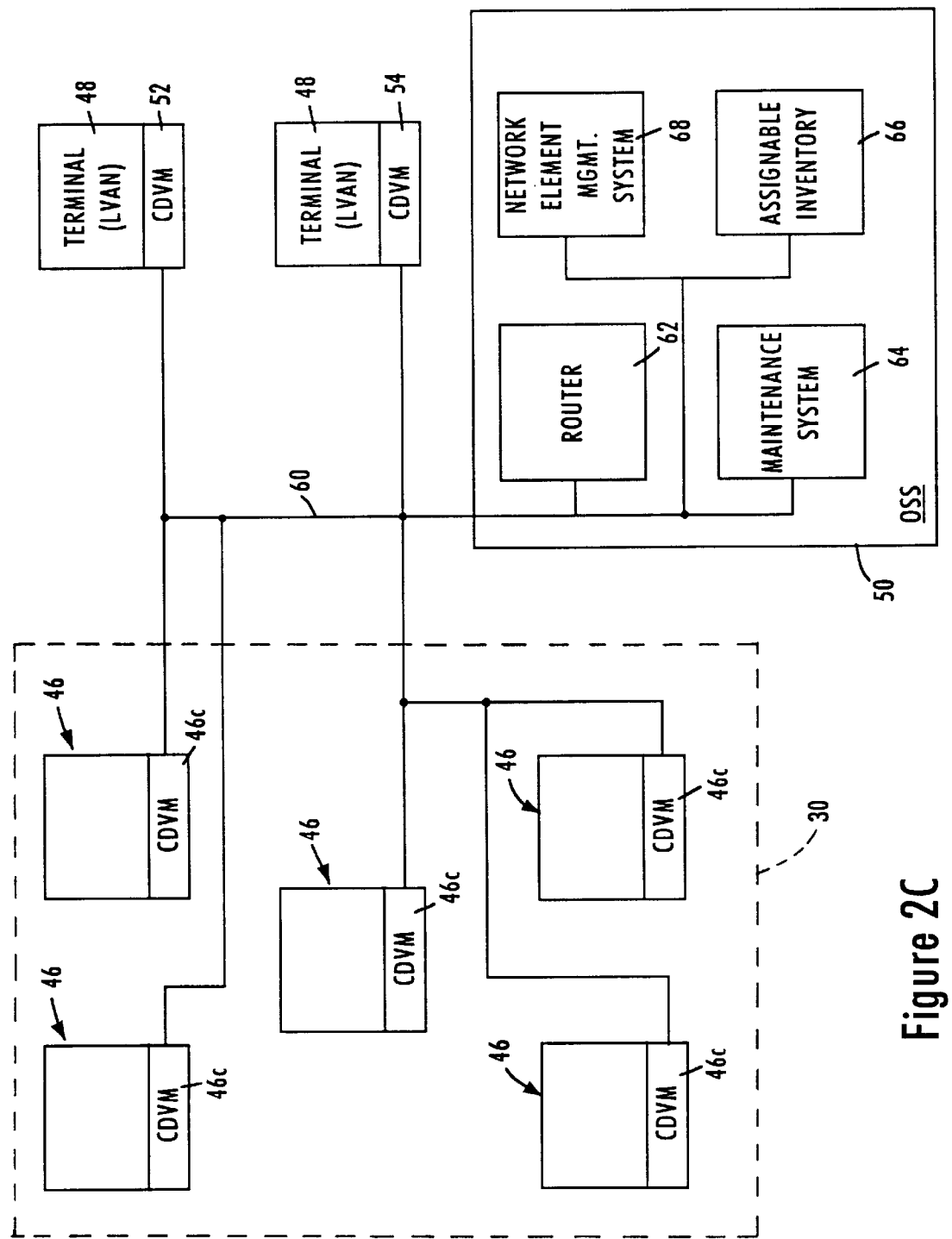

FIGS. 2A, 2B and 2C are block diagrams of a packet switched network using a system for monitoring and correcting jitter in accordance with the present invention. FIG. 2A is a diagram illustrating a packet switched network 30, such as an ATM network, that transports data from a plurality of service providers such as video information providers (VIPs) to terminal devices for local distribution. The ATM network 30 comprises a plurality of network nodes that route ATM cell streams in accordance with the corresponding cell identifiers. One type of network node is an edge device 42 that functions as a network interface for incoming data streams from different broadband data sources, such as video information providers. Another type of network node is an ATM switch 46 that routes an ATM cell stream to an identified virtual path in accordance with the cell stream identifier. Since each network node may introduce an incremental amount of cell delay variation to each cell stream, a given ATM cell stream may accumulate a substantial amount of cell delay variation before the final destination is reached. Hence, the monitoring system of the present invention enables detection of unacceptable levels of cell delay variation within the network, and enables corrective action to minimize the effects of cell delay variation.

As shown in FIG. 2A, the VIPs 40 supply multiplexed ATM cell'streams of encoded digital broadband data, such as MPEG-encoded video data, to an ATM edge device 42 of an ATM network 30. The encoding and ATM multiplexing at the headend of the VIPs 40 is described below with respect to FIG. 7. The information providers may be broadcast providers 40, or IMTV providers 40'. The ATM edge device 42 monitors the ATM cell streams from the different VIPs and determines whether ATM cells within the data streams should be passed to the network or blocked.

The ATM edge device 42 provides a grooming function, whereby input ATM cells are mapped on a cell-by-cell basis to one of the edge device output ports on the basis of the corresponding VPI/VCI header, also referred to as a cell identifier. ATM cells that do not have valid data (idle cells) or valid cell identifiers (VPI/VCI) are not mapped to an output port, effectively rejecting these ATM cells. The cell mapping by the ATM edge device 42 ensures that the output path 44 operates at full capacity transmitting a plurality of multiplexed ATM cell streams. A more detailed description of the ATM edge device is disclosed in commonly-assigned, co-pending application Ser. No. 08/370,744, filed Jan. 31, 1995, entitled FULL SERVICE NETWORK USING ASYNCHRONOUS TRANSFER MODE MULTIPLEXING (attorney docket 680-109), the disclosure of which is incorporated in its entirety by reference.

The multiplexed ATM cell streams are output from the ATM edge device 42 and sent to an ATM switch 46 via the optical fiber link 44. The ATM switch 46 provides point to-point or point-to-multipoint switching of the incoming cell streams on selected virtual paths based on the corresponding cell identifiers. The assigned virtual paths may correspond to another ATM switch 46, or may correspond to a network terminal 48 (FIG. 2B) that performs ATM adaptation layer processing (AAL-5) to obtain the payload from the cell streams. The term "network terminal" is defined as the end point of the packet switched network where the payload data is recovered from the identified ATM cell stream; additional transport may be implemented for subscriber distribution.

The virtual paths are assigned by a control center 50, also referred to as an operational support system (OSS), that manages overall operations of the ATM network 30, including routing of ATM traffic throughout the network, monitoring network performance, monitoring network capacity, performing maintenance of the network, and managing assignable inventory for existing and future network traffic. Examples of such operational support systems may be found in commonly-assigned, copending application Ser. No. 08/441,590, filed May 16, 1995, now U.S. Pat. No. 5,650,994, entitled "OPERATION SUPPORT SYSTEM FOR SERVICE CREATION AND NETWORK PROVISIONING FOR VIDEO DIAL TONE NETWORKS", (attorney docket No. 680-118), application Ser. No. 08/518,861, filed Aug. 24, 1995, now U.S. Pat. No. 5,680,325 entitled "NETWORK CAPACITY CREATION FOR VIDEO DIAL TONE NETWORK", (attorney docket No. 680-139), and application Ser. No. 08/532,314, filed Sept. 22, 1995, entitled "NETWORK CONFIGURATION MANAGEMENT SYSTEM FOR DIGITAL COMMUNICATION NETWORKS" (attorney docket No. 680-153), the disclosures of which are incorporated in their entirety by reference. Examples of ATM switches performing the basic switching functions of ATM switch 46 may be found in U.S. Pat. Nos. 5,323,389, incorporated herein in its entirety by reference.

Figure 1:
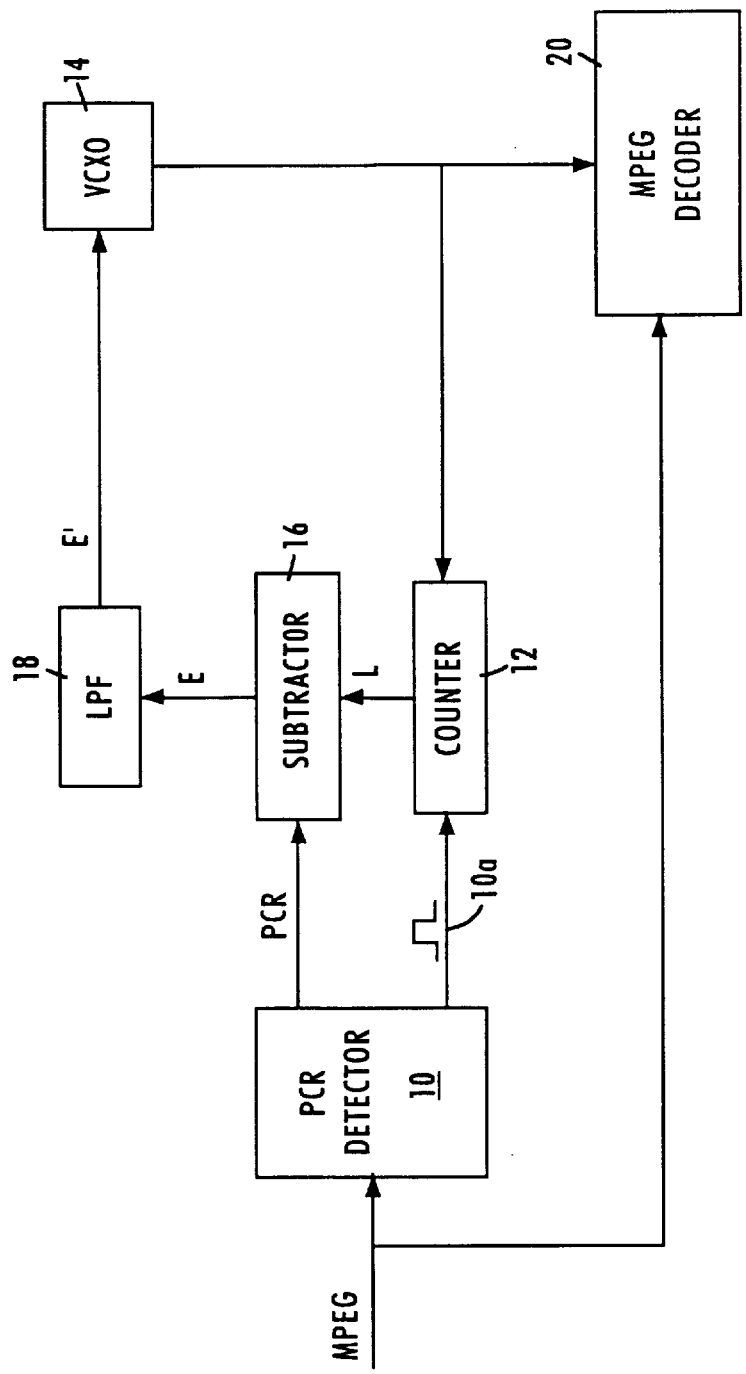
FIG. 1 is a simplified block diagram of a prior art MPEG receiver system.
Figure 7:
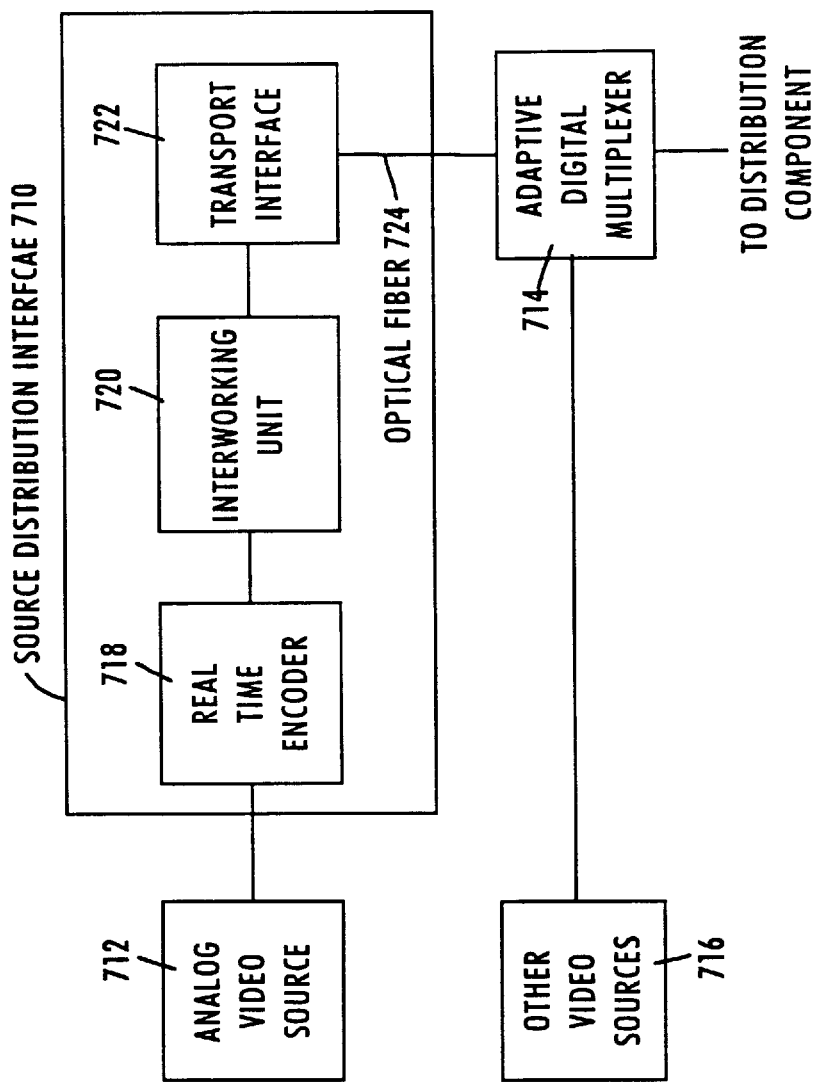
FIG. 7 is a block diagram of an encoding system at a video headend that outputs an ATM cell stream carrying encoded data packets to a broadband distribution system.

FIG. 7 is a block diagram of an encoding system at the video headend of one of the VIPs 40. FIG. 7 corresponds to FIG. 1 of the identified application Ser. No. 08/370,744 now U.S. Pat. No. 5,470,425. FIG. 7 discloses a source distribution interface 710 that generates MPEG-2 streams carrying information from a baseband analog video source 712 to an adaptive digital multiplexer 714 that monitors ATM streams to be supplied to a distribution network. The adaptive digital multiplexer 714 may also receive an ATM stream from a second video source 716. The source distribution interface 710 includes a real time encoder 718 which digitizes and compresses in MPEG-2 format the audio and video signals from the baseband analog video source 712. The real time encoder 718 processes six sets of analog audio/video program signals in parallel, adds program clock references (PCR) to each MPEG-2 bit stream, and outputs six 6 Mbit/s MPEG-2 bit streams as a single 44.736 Mbit/s DS-3 signal to an interworking unit 720.

The interworking unit 720 prepares the MPEG-2 bit streams for ATM cell stream transmission over optical fiber transport links. For example, the interworking unit 720 will divide the bit stream into segments of appropriate length payloads and combine the payloads with ATM headers to obtain an ATM cell stream. The ATM cell stream is supplied to a transport interface 722, which converts the ATM cell stream to optical signals for transmission to the adaptive digital multiplexer via an optical fiber using, for example, an optical fiber transmission standard such as OC-12.

The adaptive digital multiplexer 714 determines whether the entire OC-12 channel capacity of the optical fiber is being utilized. If the optical fiber 724 is not being utilized at capacity, then the adaptive digital multiplexer 714 permits the second video source 716 to use the transport capacity not used by the first broadcast source 712.

The MPEG-2 standard, recognized in the art, provides a standardized syntax and format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although compressed video frames can vary in size, the transport packets have a fixed 188 byte size. Thus, different frames are broken down into different numbers of MPEG transport packets. For example, for a 6 Mbits/sec encoding system, a group of frames consisting of a total of 15 frames for one-half second of video breaks down into approximately 2000 transport packets (or 4000 packets per second).

Transport stream packets consist of two sections, a 4 byte header section, an optional adaptation field and a payload section. The header information includes a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program clock reference (PCR) value within the optional adaptation field. For example, the PCR may be present in only 10 out of every 4000 video transport packets.

Thus, the encoder 718 compresses up to six NTSC analog audio/video program signals in parallel into an MPEG-2 format. The resulting six MPEG-2 packet streams with the appropriate overhead information are combined into a single MPEG-2 stream at 45 Mbits/sec (DS-3).

The DS-3 transport stream is output from the encoder 718 and supplied to an ATM interworking unit 720 which converts the MPEG-2 packets for the six programs into a single ATM cell stream containing all six programs at the DS-3 rate. In ATM, information is organized into cells having a fixed length and format. Each cell includes a header, primarily for identifying cells relating to the same virtual connection, and an information field or "payload". Specifically, a 53 byte ATM cell includes a cell header consisting of 5 bytes and a payload consisting of 48 bytes of payload data. The ATM cell header information includes a virtual path identifier/virtual circuit identifier (VPI/VCI) to identify the particular communication each cell relates to.

In ATM, transfer is asynchronous in the sense that the recurrence of cells that contain information from any particular sender is not necessarily periodic. Each device using the ATM network 30 submits a cell for transfer when they have a cell to send, not when they have an assigned or available transmission time slot. However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more capacity is needed.

Thus, the interworking unit 720 converts the MPEG-2 bit streams into payload data, adds cell headers, and outputs the ATM stream. In other words, the interworking unit 720 breaks out the individual programs into cell payloads and adds header information (including VPI/VCI) to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps two 188 byte MPEG packets into eight ATM 48 byte cells payloads. The second adaptation maps one 188 byte MPEG packet into five ATM 48 byte cell payloads.

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PCR need to be encoded and transported quickly. To avoid delaying first packets containing a PCR while processing a second packet, the multiplexer 714 maps first packets containing a PCR immediately, using the five cell adaptation procedure. As noted above, the PCR is typically present in a minimum of ten MPEG transport packets every second, with twenty PCR values being typically sent in one second. Also, at least some of those likely will arrive as the second packet of a pair. Consequently, only a very small number of packets are mapped using the less efficient 5-cell adaptation. Some systems perform PCR unaware packing, whereby two 188 byte MPEG transport packets are mapped into 8 cells regardless of the location of a PCR value. This technique may contribute to additional PCR jitter.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

The transmission of ATM cells in an asynchronous DS-3 signal may require a common clock reference in order to ensure frame alignment in the network. Thus, the six MPEG-2 channels in ATM cell format are supplied to the network in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM multiplexing operation by the adaptive digital multiplexer 714, as well as other multiplexing and switching operations in the ATM network 30, may introduce cell delay variation in the ATM cell streams transported throughout the ATM network. Hence, upon reassembling the MPEG-2 packet stream from the ATM cells, the original six 6 Mbit/s MPEG-2 bit streams may have variations in the original 6 Mbit/s data rate if the jitter is not corrected. Thus, the present invention uses cell delay variation monitors to detect the jitter caused by the accumulated cell delay variation.

As shown in FIG. 2A, the network node implemented as the ATM switch 46 comprises a switch portion 46a, an ATM adaptation processor 46b, a cell delay variation monitor (CDVM) 46c, and a selection multiplexer 46d. The switch portion 46a is a conventional ATM switch, as described in the above-identified U.S. Pat. Nos. 5,323,389, that outputs ATM cell streams on selected virtual paths. At least one of the virtual paths is also supplied to the ATM adaptation processor 46b for AAL-5 processing to recover the payload data in an ATM cell stream having a selected cell stream identifier. The selected cell stream identifier is provided, for example, by the control center 50 to monitor either a random ATM virtual path or a specific ATM virtual path for troubleshooting purposes.

The ATM adaptation processor 46b, also referred to as an ATM packet demultiplexer or AAL-5 processor, outputs the recovered payload data from the selected ATM cell stream, for example an MPEG-encoded data stream, to the cell delay variation monitor 46c. Specifically, AAL-5 processor processes eight ATM cells that contain a Protocol Data Unit (PDU) consisting of two 188 byte MPEG2 transport packets and an eight byte AAL5 trailer. The eight byte trailer is contained in the last ATM cell which is indicated by the AAU of "1". The eight byte trailer contains a four byte cyclic redundancy check (CRC) for detecting errors, and a two byte length indicator. The length indicator identifies how much MPEG data is in the PDU, and will be set, for example, to 365 (188 bytes * 2) when two MPEG transport packets are mapped into the PDU.

If the AAL5 processor 46b has captured a complete protocol data unit (PDU) containing five cells, the AAL5 processor pulls out the payload data and uses the CRC data to check for errors. If there are no errors, the original MPEG packet is reconstructed from the appropriate bytes of payload data from the first four cells. Similarly, if the AAL5 processor has captured a complete PDU containing eight cells, the AAL-5 processor pulls out the payload data, does the CRC based error check, and if there are no errors, the original pair of MPEG packets is reconstructed from the appropriate bytes of payload data from the eight cells. The reconstructed MPEG packets are then output from the AAL5 processor as a reconstructed MPEG packet stream to the cell delay variation monitor 46c.

The cell delay variation monitor 46c includes a monitoring portion and a data stream correction portion, discussed in detail below. The monitoring portion detects the time stamp values located within the MPEG-encoded data stream representing the expected arrival time and calculates the jitter value for the corresponding data stream segment, and outputs the calculated jitter value (J) to the control center 50. The control center 50 compares the calculated jitter value (J) from the corresponding node 46 with a predetermined value to determine if the calculated jitter is within an acceptable level.

If the control center 50 determines that correction of the detected jitter is necessary at the ATM switch 46, the control center will output a correction signal (C) to the CDVM 46c and a selection signal to the selection multiplexer 46d. As explained below, the data stream correction portion of the CDVM 46c reduces the jitter in the selected data stream and outputs the corrected data stream to the selection multiplexer 46d. The selection multiplexer 46d, also referred to as an ATM output processor, performs ATM processing to recreate the ATM cell stream and output the recreated ATM cell stream on the original virtual path. However, if the CDVM 46c is used for monitoring purposes only, then the selection multiplexer 46d will receive configuration information from the control center 50 to pass the received ATM cell streams without any modification.

FIG. 2B is a block diagram illustrating the terminating portion of the ATM network 30 receiving the ATM cell streams after network transport. Cell delay variation monitors 52 and 54 similar to the CDVM 46c of FIG. 2A detect the jitter caused after transport through the ATM network 30. The terminal system 48a receives ATM cell streams carrying broadcast and IMTV data from two different virtual paths. The terminal 48a, also referred to as a local video access node (LVAN), performs AAL-5 processing and outputs the MPEG streams as multiplexed digital data streams on multiple RF channels for local distribution. Another terminal 48b receives only the broadcast virtual path, performs AAL-5 processing, and outputs the broadcast MPEG streams on multiple RF channels for local distribution.

As shown in FIG. 2B, the CDVMs may be arranged to detect the cell delay variation either before or after termination at the receiving terminals 48. For example, an ATM adaptation processor 58 performs AAL-5 processing on one of the ATM cell streams on the virtual path carrying interactive multimedia (IMTV) traffic to obtain an MPEG-encoded data stream. The CDVM 52 detects the amount of jitter in a selected MPEG-encoded data stream and outputs the calculated jitter value (J) to the control center 50. The control center 50 thus monitors the jitter in the IMTV virtual path terminated by the terminal system 48a. Similarly, the CDVM 54 monitors the jitter by comparing the time stamp values in the MPEG streams output by the broadcast terminal 48b, and outputs the detected jitter to the control center 50.

Additional details of ATM transmission techniques, the terminals 48 and local distribution techniques including hybrid fiber coax and wireless are disclosed in commonly-assigned, co-pending application Ser. No. 08/250,792 now U.S. Pat. No. 5,608,475, filed May 27, 1994, entitled FULL SERVICE NETWORK (attorney docket 680-080), and the commonly-assigned, copending application Ser. No. 08/413,215, now U.S. Pat. No. 5,684,799, entitled "FULL SERVICE NETWORK HAVING DISTRIBUTED ARCHITECTURE", filed Mar. 28, 1995 (attorney docket 680-122), and the commonly-assigned, copending application Ser. No. 08/405,558, now U.S. Pat. No. 5,651,010, entitled "SIMULTANEOUS OVERLAPPING BROADCASTING OF DIGITAL PROGRAMS", filed Mar. 16, 1995 (attorney docket 680-130), the disclosures of which are incorporated in their entirety herein by reference.

FIG. 2C is a block diagram of a system for monitoring the jitter in the ATM network 30. The monitoring system includes a plurality of cell delay variation monitors 46c disposed within the ATM network 30 and a plurality of monitors 52 and 54 disposed outside the ATM network 30, a data network 60 such as an Ethernet-based network, and the operational support system 50 that receives the detected jitter values from the cell delay variation monitors. The OSS 50 measures the jitter at the different network locations in order to determine the performance of the corresponding ATM switches 46. In addition, the OSS 50 can configure the CDVMs 46b to measure the same ATM cell stream along its assigned virtual path to determine the performance of nodes serving the virtual path. Thus, by tracking the jitter of different virtual paths throughout the ATM network, the OSS 50 is able to monitor the performance of the overall network.

Since jitter may be caused by different factors such as heavy traffic, faulty components, etc., the OSS 50 may make statistical comparisons to determine whether a network node is malfunctioning or whether the node suffers from traffic overload. As described in detail in the above-identified copending applications, the OSS 50 preferably includes a routing module 62, a maintenance tracking module 64, an assignable inventory module 66, and a network element management system 68. The routing module 62 tracks all assigned logical paths between network nodes that define virtual paths in the network 30. If the OSS 50 detects a jitter value for a corresponding network node that is above a predetermined threshold, the OSS may use the routing module 62 to determine if the network node is suffering from traffic overload.

If the routing module 62 indicates a heavy traffic load for the network node, the OSS may use the routing module 62 to reroute ATM traffic to reduce the load on the network node; in such a case, routing module 62 would assign new logical paths for the rerouted traffic from the assignable inventory 66. If necessary, the OSS would also order the creation of new capacity, as described in the above-identified application Ser. No. 08/518,861, now U.S. Pat. No. 5,680,325, entitled "NETWORK CAPACITY CREATION FOR VIDEO DIAL TONE NETWORK", filed Aug. 24, 1995 (attorney docket 680-139).

If the routing module 62 determines that the network node does not have a heavy traffic load, the OSS 50 may then send an instruction to the network element management system 68 to test for trouble at the network node. In such a case, the network element management system will send an instruction to the network node to perform self-diagnostics for network node performance verification.

Alternately, the OSS 50 may temporarily take the network node offline by instructing the router 62 to reroute all traffic from the network node, and then instruct the maintenance module 64 to initiate and track service on the network node. The maintenance module 64 will then dispatch service personnel to repair or replace defective components that are introducing excess cell delay variation. The corresponding CDVMs may then be used for troubleshooting or diagnostic routines on the node being serviced, and performance verification once service has been completed.

Thus, the monitoring system of the present invention may be used to monitor the performance of the overall network 30 by performing periodic measurements of jitter on selected virtual paths. The monitoring system may also perform localized performance testing and troubleshooting of selected network elements to identify troubles within the network. As discussed in detail below, the OSS 50 may also output correction values to the appropriate CDVMs to correct the time stamp values in the selected data streams. Thus, the detected jitter can be minimized by modifying the data stream at the detection site to provide a data packet stream having correct time stamp values.

FIG. 3 is a block diagram of a jitter correction device according to a preferred embodiment of the present invention. The jitter correction device 122 is adapted to receive a MPEG-encoded data packet stream that has been transported through a broadband transport network. The jitter correction device 122 corresponds to the CDVM's 46c, 52, and 54. Although the received MPEG-encoded packet stream may have jitter due to transport over various types of networks, the present invention is particularly adapted to correcting for jitter created by cell delay variations during transport via an ATM network. Moreover, although the jitter correction device 122 is disclosed as receiving an MPEG-encoded data stream, it will be appreciated that any digitally coded data stream may be applied that has packets carrying time stamp information at intervals in the data stream. For the sake of simplicity, however, the preferred embodiment is disclosed with respect to a jitter correction device that corrects the data rate of the corrected MPEG stream with respect to the enclosed packets carrying program clock reference (PCR) data.

The MPEG stream supplied to the PCR detector 124 and a correction circuit 142 (discussed in detail below) is a single selected MPEG program having a specific program identification (PID) value. Thus, the jitter correction device 122 will typically receive a specific PID value from the OSS 50 to select a specific MPEG stream from a stream of multiplexed MPEG streams.

As shown in FIG. 3, the jitter correction device 122 comprises a PCR detector 124 that detects each occurrence of a PCR value in the MPEG stream. As indicated above, the PCR value represents the expected arrival time of the particular data packet in the data stream. The PCR value is generated during encoding in the real time encoder 718 shown in FIG. 7. The program clock reference PCR value is carried in an optional adaptation field within an MPEG packet, as discussed in detail below with respect to FIG. 4, and is presented at intervals within the transport packets. In this example, the PCR may be present in as few as ten transport packets per second.

Upon detecting a PCR value, the PCR detector 124 outputs a detection signal (EN), and outputs the detected PCR value ($X_n$) to a detection processor 128. The detection processor 128 also receives a signal $Y_n$ representing an actual arrival time for the corresponding data packet stream segment. The signal $Y_n$ is generated by a timing circuit 130 that outputs the actual arrival time signal $Y_n$ in response to the detection signal (EN) from the PCR detector 124, and in response to an independent clock signal.

The timing circuit 130 comprises a counter 132, such as a modulo $2^{30}$ counter, that increments and outputs a count value in response to the independent clock signal generated by clock 134. The independent clock 134 is a clock having a clock rate that is independent of the detection of the PCR values from the received MPEG stream. Thus, unlike the VCXO in FIG. 1, the independent clock 134 is not affected by differential delays in the MPEG stream, and therefore is able to measure the actual arrival time of the MPEG stream segment between successive PCR values.

The independent clock 134 may be implemented as a crystal oscillator that is synchronized to well-known reference time standards. Alternatively, the clock signal may be provided from a separate source, such as a network clock, or a GPS receiver. In any event, the clock 134 is independent of the received MPEG stream and the detected PCR values.

The counter 132 outputs the count value to a latch circuit that latches the count value from the counter 132 in response to the detection signal (EN) from the PCR detector 124. The latch circuit 136 outputs the latched count value to a time converter 140 that converts the count value output by the latch 136 to a recognizable format, such as milliseconds or clock cycles of a 27 MHz clock. Alternatively, the functions of the time converter 140 may be performed in the detection processor 128.

The detection processor 128 calculates the jitter based on the a correlation of the expected arrival time $X_n$ and the actual arrival time $Y_n$. The detected jitter value is output to a data network interface 148, such as an Ethernet card, that sends and receives data to and from the OSS. In response to a correction command from the OSS, the detection processor 128 also uses the detected jitter value to generate control signals for a data packet stream correction circuit 142 that receives the MPEG stream transported through the network and outputs a corrected data packet stream having PCR values that identify an expected arrival time substantially coinciding with the actual time duration of the corresponding data packet stream segment. The data packet stream correction circuit 142 selectively uses one of two techniques to eliminate the jitter from the MPEG stream caused by, for example, cell delay variation. One technique, as discussed in detail below, involves selectively buffering the MPEG stream using a buffer 144 in response to buffer control signals from the detection processor 128 (BA, OC). The second technique for correcting for the jitter in the MPEG stream is by using a timing restamp module 146, whereby the PCR values stored in the MPEG stream are rewritten with corrected time stamps in accordance with the detected jitter. As shown in FIG. 3, the data packet stream correction circuit comprises the buffer circuit 144 and the time restamp module 146. As such, either technique may be used alone or in combination to provide the corrected MPEG stream.

Figure 4:
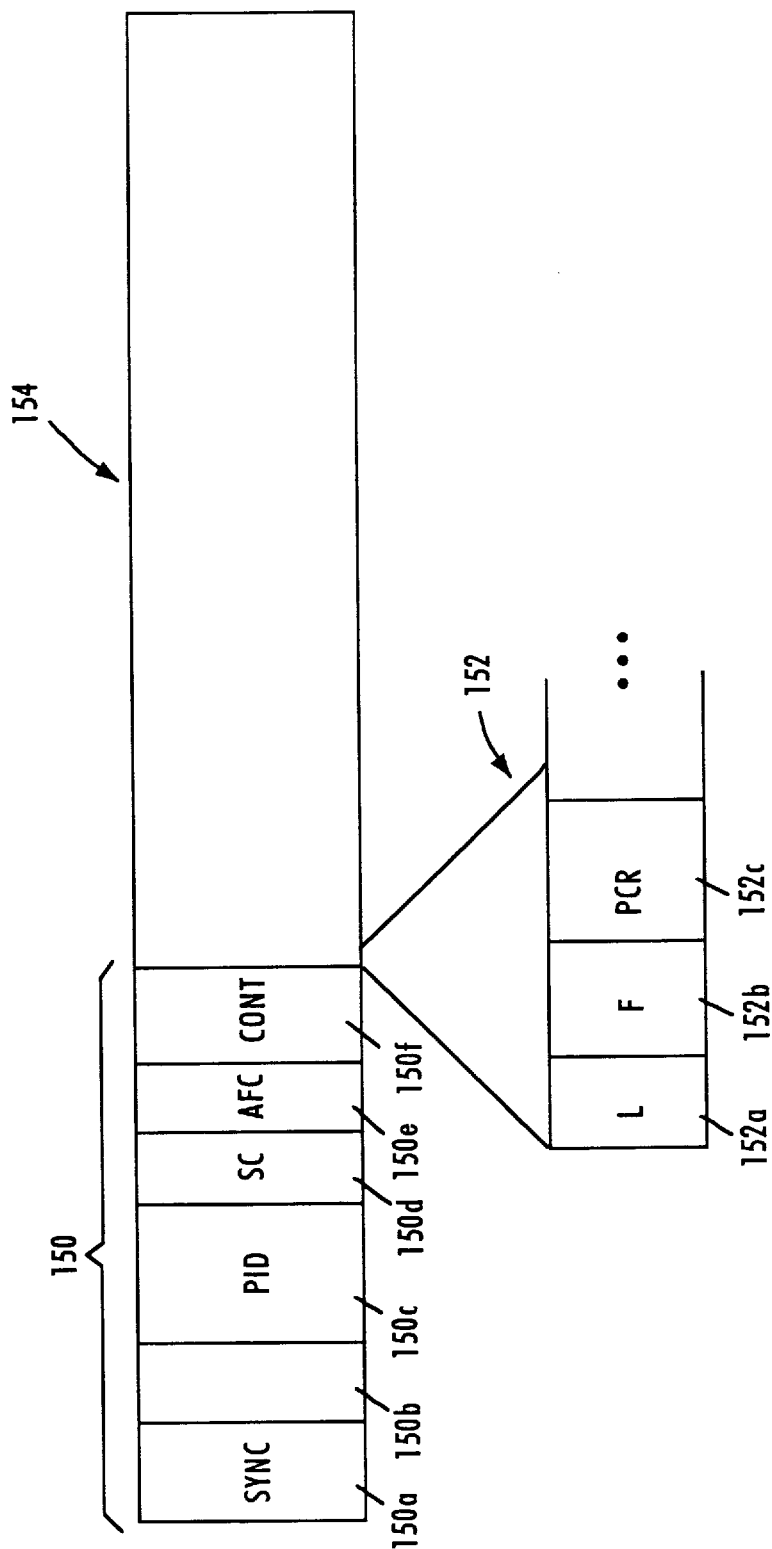
FIG. 4 is a simplified illustration of a format structure of an MPEG-2 encoded data packet.

FIG. 4 discloses a simplified illustration of a format structure of an MPEG-2 encoded data packet. As discussed above, the MPEG transport packet has a fixed 188 byte size. The transport stream packet shown in FIG. 3 has a 4-byte header section 150, an optional adaptation field 152, and a payload section 154. The header information includes a synchronization byte (SYNC) 150a, a flag portion 150b having three 1-bit flags, for example, start indicator and transport error indicator. The header section 150 also includes a 13-bit program identification (PID) 150c. The header 150 also includes a 2-bit scrambling control (SC) 150d, a 2-bit adaptation field control (AFC) 150e, and a 4-bit continuity counter (CONT) 150f. The adaptation field control 150e identifies the presence of the optional adaptation field 152.

The optional adaptation field 152 comprises a length byte (L) 152a, an 8-bit flag portion (F) 152b, and a 42-bit PCR field 152c. One of the flags in the flag field 152b is a PCR flag, whereby if the flag is set to 1, then the PCR value is present; however, if the PCR flag is 0, then the PCR value is absent. Therefore, the PCR detector 124 identifies the occurrence of the PCR value in the optional adaptation field by reading the adaptation field control 150e to determine whether an optional adaptation field is present. If the 2-bit adaptation field control 150e identifies the presence of the optional adaptation field 152, the PCR detector 124 checks the PCR flag in the flag portion 152b to determine whether the PCR value is present. If the PCR flag indicates that the PCR value is present, the PCR detector outputs the PCR detection signal (EN) and reads the PCR value from the PCR field 152c.

According to the present invention, the jitter is determined by the correlation of expected arrival time and the actual arrival time with an accumulation of expected and actual arrival times of previously-received data packet stream segments. The actual arrival time is measured based on the detection of the PCR values. Such an approach, which does not employ a voltage controlled, oscillator, departs from the prior art. The prior art uses a 27 Mhz VCXO 14 to synchronize with the detected PCR values. Moreover, the independent clock, such as clock 134, may use different data clock rates, as desired. As such, the burden is effectively on the detection processor 128 to calculate the time in seconds, in the absence of the converter 140. Preferably, the converter 140 outputs the differential count values as 27 MHz clock cycles.

Figure 5A:
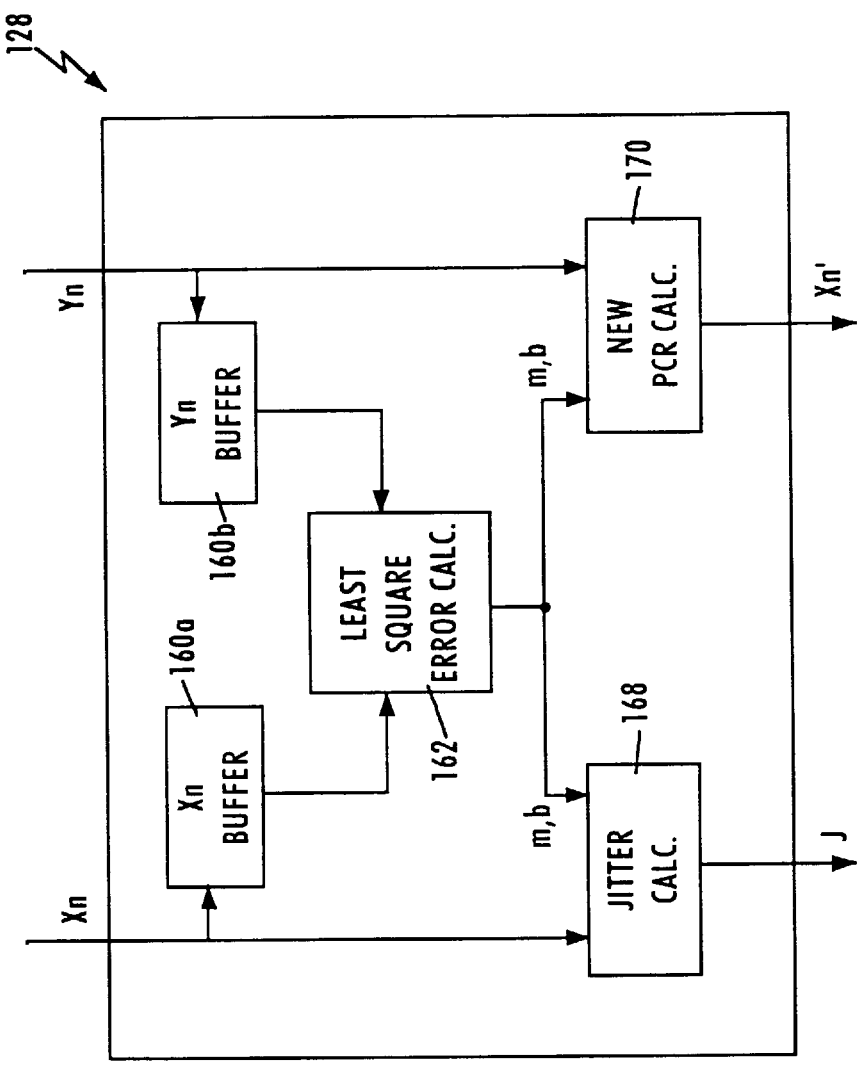
FIGS. 5A and 5B summarize the preferred implementation of the detection processor of FIG. 3.
Figure 5B:
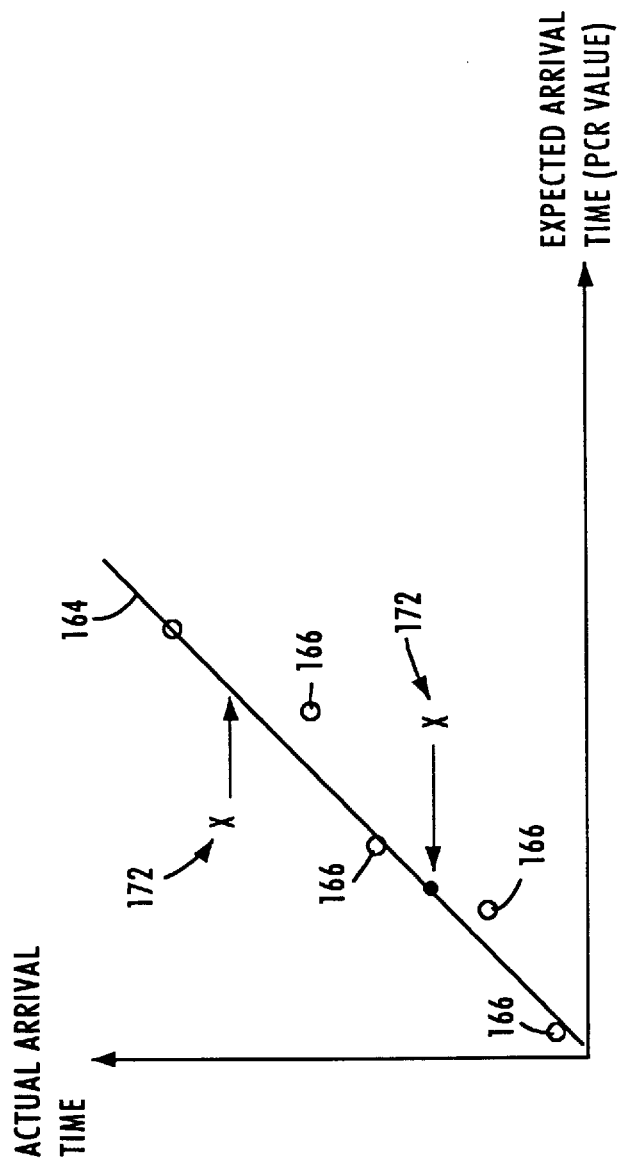

FIG. 5A is a block diagram illustrating the detection processor 128 of FIG. 3. The detection processor 128 includes a PCR buffer 160a that receives the PCR value $(X_n)$ representing the expected arrival time, and a count buffer 160b that receives the count value $(Y_n)$ representing the actual arrival time. The buffered values are supplied to a least square error calculator 162 that calculates a least squares line 164, shown in FIG. 5B.

The least square error calculator 162 calculates the least squares line 164 by performing a best fit approximation of a plurality of samples 166 of expected/actual arrival pairs of previously-received data packet stream segments. According to the disclosed embodiment, the calculator 162 accumulates approximately 50–100 samples 166 before performing the best fit approximation. The calculator 162 outputs the slope (m), and y-intercept (b) of the best fit approximation line 164, according to the equation Y=mX+b, to a jitter calculator 168 and a new PCR calculator 170.

The jitter calculator 168 determines a desired actual arrival time $(Y_n')$ according to the equation $Y_n'=mX_n+b$, representing the ideal location of the arrival time on line 164 with respect to the received PCR value. The jitter J is then calculated as the difference $J=Y_n'-Y_n$. The new PCR calculator 170 recalculates the new PCR value $(X_n')$, also referred to as a restamp value, according to the equation $X_n'=(Y_n-b)/m$. As shown in Figure SB, the new PCR calculator 170 effectively shifts the received PCR values 172 to the calculated best fit line 164.

According to the present invention, the estimation accuracy of the PCR values is based on the accuracy of the MPEG clock in the encoder 718 shown in FIG. 7, and the accuracy of the independent clock 134. Thus, according to the preferred embodiment, the jitter can be calculated to a resolution of at least within 10 microseconds.

Referring to FIG. 3, the restamp values calculated by the detection processor 128 are output to the timing restamp module 146 when the timing restamp mode is used in the jitter correction device 122. The timing restamp module 146 includes a restamp writing circuit (not shown) that writes the restamp value $X_n'$ into the PCR field 152c as the corrected PCR value. In the event that a combination of the buffer techniques and the timing restamp techniques is desired, the restamp value Xn' is provided to buffer control circuitry (not shown) in the detection processor 128, which translates the restamp value to the appropriate buffer control signals to the buffer 144.

In addition, the buffer 144 outputs buffer fullness signals (BF) to the detection processor 128 indicating the relative fullness of the buffer 144 with MPEG data. Specifically, the buffer 144 is preferably a first-in, first-out (FIFO) buffer that receives the MPEG stream at a particular input data rate. The input data rate will typically be 6 Mbits/sec, with a maximum rate of 15 Mbits/sec. The buffer 144 should be large enough to carry at least one MPEG stream segment, i.e., at least large enough to carry at least two packets carrying PCR values. As discussed above, the PCR values are typically sent at a rate of twenty per second, giving a typical separation of 0.05 sec. However, since the minimum number of PCR values is specified at ten out of every 4000 packets (i.e., ten per second), the maximum separation possible is 0.1 seconds without jitter. Thus, since the maximum separation between two PCR values is approximately 0.1 seconds, the buffer 144 needs a maximum size of 1.5 Mbits. Typically, however, a data rate of 6 Mbits/sec will require only a buffer having a size of 0.6 Mbits.

In the buffer correction mode, the jitter correction device 122 operates on the assumption that the buffer 144 will have empty locations, depending on the input data rate. Ideally, the buffer 144 is 50% full with valid data. By adjusting the fullness of the buffer 144, the MPEG stream can be adjusted so that the PCR values correspond correctly to the duration, or arrival time of the MPEG stream segment. In other words, the detection processor 128 outputs a buffer adjust control signal (BA) to change the fullness of the buffer 144 in order to lengthen or shorten the MPEG data stream segment by changing the time spacing between the packets output from the buffer.

A second approach using the buffering technique is adjusting the output data rate of the buffer 144. Specifically, for a 6 Mbit/sec input stream, in which there is no detected jitter, the buffer 144 will output the MPEG stream at a data rate of 6 Mbit/sec. If, however, the detection processor 128 determines the presence of jitter, then the detection processor changes an output clock signal (OC) to increase or decrease accordingly the output data rate of the buffer 144 to compensate for the jitter. Thus, the buffer output data rate is adjusted so that the PCR values correctly correspond to the arrival time of the data stream segment. Thus, if a PCR value entered the PCR detector too early, then the output data rate of the buffer 144 would be slowed down accordingly. If, however, the PCR value entered the PCR detector too late, then the output data rate of the buffer 144 would be increased. Thus, the buffer 144 can be used either to change the spacing between MPEG packets, or to change the output data rate in order to compensate for the detected jitter.

Figure 6:
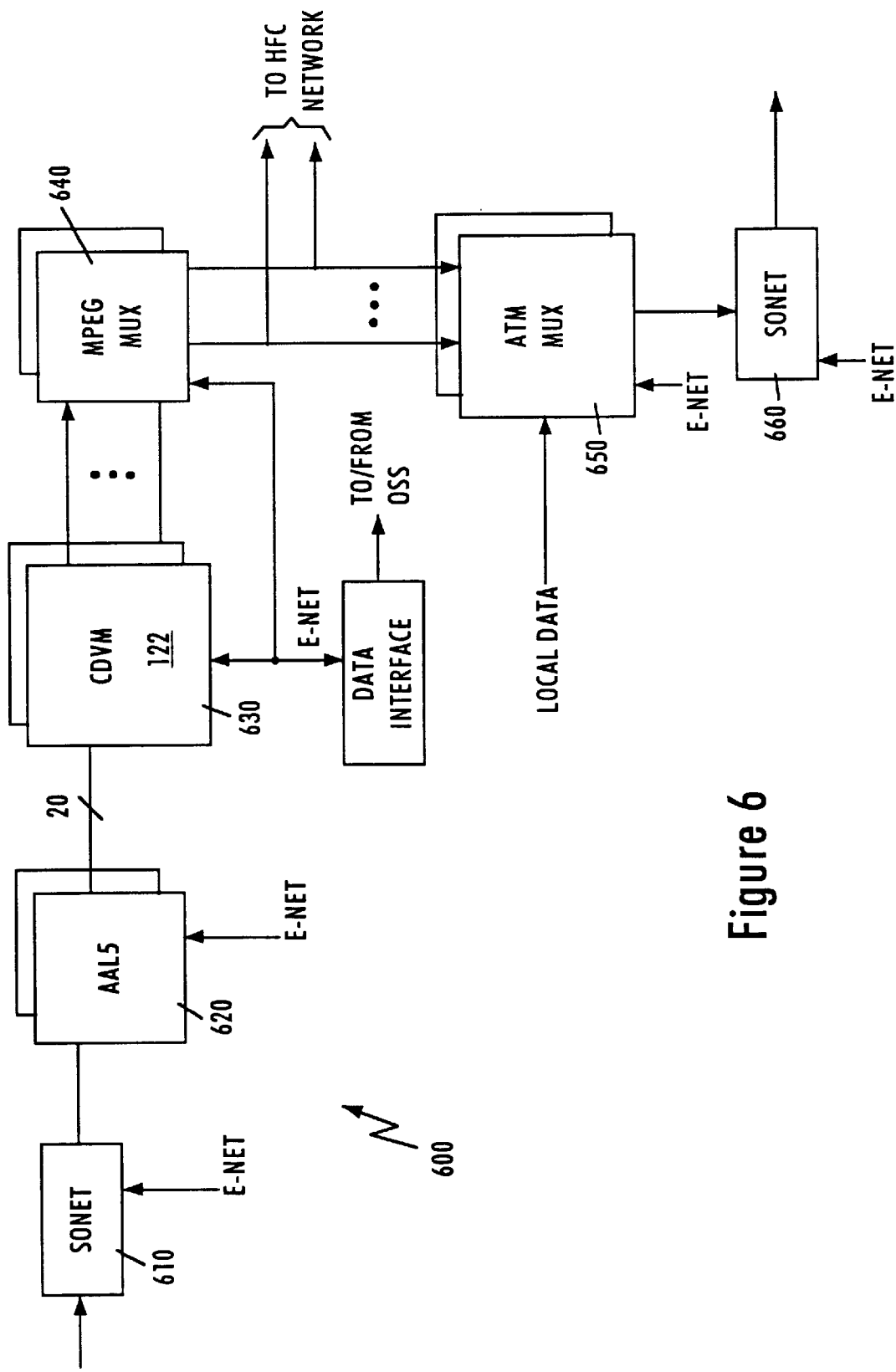
FIG. 6 is a block diagram of the cell delay variation monitor implemented in a network node.

FIG. 6 discloses an alternative ATM packet demultiplexer implementing the cell delay variation module of the present invention. The ATM packet demultiplexer is of the type described in the identified, copending application Ser. No. 08/413,207, now U.S. Pat. No. 5,544,161, (attorney docket 680-116). Specifically, the ATM packet demultiplexer is typically used at the terminal 48a, also referred to as a video end office, to demultiplex ATM cell streams from the ATM broadband network to MPEG-encoded data output on selected RF channels to a local loop distribution network. The cell delay variation module 122 of the present invention is added to eliminate jitter present in the MPEG-encoded data before transmission to the local loop distribution network. However, the ATM packet demultiplexer may also be used to minimize cell delay variations in ATM cell streams carrying MPEG data multiplexed with local data before further transmission on the ATM network. In other words, the corrected MPEG stream may be repacketed by an ATM multiplexer that outputs the corrected MPEG stream in a new ATM cell stream for further transmission on the network.

The disclosed ATM packet demultiplexer (APD) is designed to process an ATM cell stream having a specified VPI/VCI value. Thus, a plurality of APD's will typically be arranged in parallel when implemented in the ATM network, whereby each APD will receive a dedicated virtual path on the basis the a predetermined VPI/VCI range. In other words, each APD serves a predetermined range of VPI/VCI values on the dedicated virtual path.

As shown in FIG. 6, the preferred ATM packet demultiplexer 600, also referred to as an MPEG router, comprises an input processor 610, an ATM adaptation layer (AAL5) processor 620, a cell delay variation module 630, and a transport multiplexer (MPEG MUX) 640. When implemented as an actual node of the ATM network 50, the jitter correction node will also include an ATM multiplexer 650 and an output interface 660. The input processor 610 is preferably a SONET interface that receives OC-3c ATM stream from ATM network 50. The interface 722 performs clock and frame recovery of the SONET frame, cell delineation, Header Error Check (HEC) verification, and deletion of unassigned or idle ATM cells. The ATM stream is output to the AAL5 processor 620.

The AAL5 processor 620 performs ATM Adaptation Layer (AAL-5) processing to reassemble the ATM cell payloads and perform a CRC and length check. Specifically, the AAL5 processor 620 buffers cells until it finds a cell having an ATM cell Adaptation Unit (AAU) value of "0" in its header (first cell) and another cell having an AAU value of "1" in its header (last cell) . The AAL5 processor 620 counts the number of cells from first to last to determine the type of adaptation used to map cells.

If the AAL5 processor 620 has captured five cells, the receiver pulls out the payload data and uses the CRC data to check for errors. If there are no errors, the original data is reconstructed from the appropriate bytes of payload data from the first four cells. Similarly, if the receiver has captured eight cells, the AAL5 processor 620 pulls out the payload data, does the CRC based error check, and if there are no errors, the original data contained in the Protocol Data Unit (PDU) is reconstructed from the appropriate bytes of payload data from the eight cells.

The PDU's carrying broadband data are output to the CDVM 630 to correct for jitter caused by cell delay variation in accordance with commands supplied from the OSS via the Ethernet interface, as discussed above in detail with respect to FIG. 3. The corrected MPEG stream is then output to an MPEG multiplexer 640 for multiplexing to the appropriate output stream. Although not shown, the APD may also include additional components for multiplexing the MPEG-encoded data streams for distribution in the hybrid fiber coax-type (HFC) network, such as an out-of-band signalling processor outputting signalling data.

The MPEG multiplexer 640 multiplexes the corrected MPEG streams to one of five output 27 MB/s transport streams in accordance with the routing information from the OSS via Ethernet. In addition, the MPEG multiplexer 640 monitors PID faults, erroneous packets, loss packets, and redundant packets in each transport stream. Finally, the MPEG multiplexer 640 outputs the five 27 MB/s transport streams to either a TAXI interface (not shown), which outputs the five 27 MB/s transport streams to QAM modulators for distribution to the HFC network, or to an ATM multiplexer 650, which performs ATM cell processing to output an new stream of ATM cells to a SONET output interface 660.

The present invention provides an arrangement for monitoring operations in a packet switched network by detecting jitter in encoded data streams caused by cell delay variations during transport through the packet switched network. The disclosed system performs corrective action in response to the detected jitter, including performance testing of network elements, rerouting network traffic either temporarily or permanently, initiating work and maintenance to performed on the network elements, and initiating requests for increase in network transport capacity. The disclosed system also provides for localized jitter correction at the detection site resulting in corrected MPEG streams, whereby the stored PCR values identify an expected arrival time substantially coinciding with the actual time duration of the corresponding data packet stream segment from the corrected MPEG stream. Unlike the prior art, the variations in the PCR values are detected using an independent clock source, thereby ensuring that no errors arise due to jitter in the MPEG stream. Moreover, the corrected MPEG stream can be formed either by selectively buffering the received MPEG stream, by restamping the stored PCR values with corrected PCR values, or a combination of the two.

Although the preferred embodiment of the present invention has been described with respect to the transport of MPEG-encoded data streams in an ATM network, it will be appreciated that any coding standard can be used for the data being transported, so long as the coded data stream includes time stamp information identifying an expected arrival time of the corresponding data packet stream segment.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for minimizing jitter caused during transmission of a data packet stream, comprising:
   a time stamp detector detecting time stamp values within said data packet stream, each time stamp value representing an expected arrival time of a corresponding data packet stream segment;
   a timing circuit, responsive to a clock signal, for determining an actual arrival time for each said corresponding data packet stream segment;
   a detecting circuit detecting jitter in each data packet stream segment by executing a correlation of the corresponding expected arrival time and the corresponding actual arrival time with an accumulation of expected and actual arrival times of previously-received data packet stream segments; and
   a data packet stream correction circuit outputting said data packet stream as a corrected data packet stream having time stamp values adjusted in response to said correlation.

2. An apparatus as in claim 1, wherein said data packet stream correction circuit comprises a timing restamp module replacing said time stamp values with corrected time stamp values in accordance with said correlation.

3. An apparatus as in claim 2, wherein said data packet stream correction circuit further comprises a buffer circuit receiving said time stamp values.

4. An apparatus as in claim 3, wherein said buffer circuit has an output data rate controlled in response to said correlation.

5. An apparatus as in claim 3, wherein said buffer circuit selectively adjusts a spacing between packets in said data packet stream in accordance with said correlation.

6. An apparatus as in claim 3, further comprising an independent clock source outputting said clock signal.

7. An apparatus as in claim 1, wherein said data packet stream is received in MPEG format, said time stamp detector detecting said time stamp values as program clock reference (PCR) values from an MPEG stream having a selected program identifier (PID) value.

8. An apparatus as in claim 7, wherein said data packet stream correction circuit comprises a buffer circuit receiving said MPEG stream for adjusting said time stamp values.

9. An apparatus as in claim 8, wherein said buffer circuit has an output data rate controlled in response to said correlation.

10. An apparatus as in claim 8, wherein said buffer circuit selectively adjusts a spacing between packets in said MPEG stream in accordance with said correlation.

11. An apparatus as in claim 8, wherein said buffer circuit adjusts said time stamp values in accordance with said corresponding correlation and a buffer fullness ratio.

12. An apparatus as in claim 8, wherein said data packet stream correction circuit further comprises a timing restamp module replacing said PCR values in said MPEG stream with corrected PCR values in accordance with said correlation.

13. An apparatus as recited in claim 7, wherein said data packet stream correction circuit comprises a timing restamp module replacing said PCR values in said MPEG stream with corrected PCR values in accordance with said correlation.

14. An apparatus as in claim 1, wherein said detecting circuit comprises a least square error calculator for calculating a least square error from the expected and actual arrival times of said previously received data packet stream segments.

15. An apparatus as in claim 14, wherein said detecting circuit further comprises a jitter calculator calculating said detected jitter in response to said actual arrival time and a desired actual arrival time generated in response to said expected arrival time and the least squared error.

16. An apparatus as in claim 14, wherein said detecting circuit further comprises a restamp calculation circuit outputting a restamp value to said timing restamp module in response to said expected arrival time and the least square error.

17. An apparatus as recited in claim 1, said timing circuit comprising an independent clock source generating said clock signal.

18. An apparatus as recited in claim 1, further comprising an ATM input processor outputting said data packet stream from an ATM cell stream having a selected virtual path identifier.

19. An apparatus as recited in claim 18, further comprising an ATM output processor outputting a second ATM cell stream carrying said corrected data packet stream.

20. An apparatus as recited in claim 1, further comprising a data interface for supplying the calculated jitter to a control center managing operations of a network transporting said data packet stream, and for supplying a correction signal from said control center to said data packet stream correction circuit, the correction circuit outputting said corrected data packet stream in response to said correction signal.

21. A method for measuring jitter in a transport stream of MPEG-encoded data packets, comprising the steps of:
    detecting program clock reference (PCR) values from the transport stream, each PCR value identifying an expected arrival time of a corresponding portion of said transport stream;
    identifying an actual arrival time for each said portion of said transport stream in accordance with a clock signal independent from the transport stream; and
    calculating said jitter based on a correlation of the corresponding expected and actual arrival times with an accumulation of respective expected and actual arrival times of prior portions of the transport stream.

22. The method of claim 21, further comprising the steps of:
    receiving said MPEG-encoded data packets from an asynchronous transfer mode (ATM) stream of cells; and
    selecting at least one of said MPEG streams in accordance with a selected program identifier (PID) value.

23. The method of claim 21, wherein said calculating step comprises:
    calculating a least square error of the accumulation of respective expected and actual arrival times of prior portions of the transport stream;
    determining a desired actual arrival time in response to the expected arrival time for said each portion of the transport stream and the least square error; and
    comparing the desired actual arrival time with the actual arrival time for said each portion of the transport stream to determine said jitter.

24. The method of claim 23, further comprising correcting the jitter in response to a comparison between the expected arrival time and the least square error.

25. The method of claim 21, wherein the detecting, identifying, and calculating steps each are executed at a network node, the calculating further comprising supplying the calculated jitter from the node to a control center managing operations of a network transporting the transport stream.

26. The method of claim 25, further comprising correcting said jitter in response to a correction signal from the control center.

27. The method of claim 25, further comprising performing network operations at the network control center to control transport of the transport stream in response to the calculated jitter.

28. The method as in claim 27, wherein said step of performing network operations comprises the step of routing traffic from the network node.

29. A method as in claim 27, wherein said step of performing network operations further comprises the step of initiating a service request in a work force management system portion of the operational support system.

30. A method as in claim 27, wherein said step of performing network operations comprises the step of initiating a service request in a work force management system portion of the operational support system.

31. A method as in claim 27, wherein said step of performing network operations comprises the step of initiating a request for creation of new capacity for the network.

32. A method as in claim 27, wherein said step of performing network operations comprises the steps of:
    outputting a jitter correction control signal to the network node in response to the detected jitter; and
    correcting the jitter at the network node in response to the jitter correction control signal.

33. A system for monitoring jitter in a packet switched network, comprising:
    a plurality of monitors each comprising:
        (a) a packet demultiplexer selecting a data packet stream from the packet switched network and outputting a digital data stream from the selected data packet stream;
        (b) a time stamp detector detecting time stamp values located within said digital data stream and representing an expected arrival time of a corresponding digital data stream segment,
        (c) a timing circuit, responsive to a clock signal, determining an actual arrival time for each said corresponding digital data stream segment, and
        (d) a detecting circuit for calculating a jitter value for each digital data stream segment on the basis of the corresponding expected and actual arrival times; and
    an operational support system receiving said detected jitter values from the monitors and managing operations of the packet switched network.

34. A system as in claim 33, wherein:
    said operational support system outputs at least one correction signal in response to the detected jitter values, and
    each of said monitors further comprises a data stream correction circuit, responsive to the at least one correction signal, receiving the digital data stream and outputting a corrected digital data stream having time stamps identifying an expected arrival time substantially coinciding with an actual arrival time of each corresponding digital data stream segment of said corrected digital data stream.

35. A system as in claim 34, wherein said data stream correction circuit comprises a timing restamp module replacing said time stamps with corrected time stamps in accordance with said detected jitter, and a buffer circuit receiving said digital data stream for adjusting said actual arrival time of each said corresponding digital data stream segment in accordance with said detected jitter.

36. A system as in claim 35, wherein said buffer circuit has an output data rate controlled in response to said detected jitter.

37. A system as in claim 35, wherein said buffer circuit selectively adjusts a spacing between packets in said digital data stream in accordance with said detected jitter.

38. A system as in claim 35, further comprising an independent clock source outputting said clock signal.

39. A system as in claim 33, wherein said digital data stream is output from said packet demultiplexer in MPEG format, said time stamp detector detecting said. time stamp values as program clock reference (PCR) values from an MPEG stream having a selected program identifier (PID) value.

40. A system as in claim 39, wherein said monitors each further comprise a correction circuit having a buffer circuit that receives the corresponding MPEG stream and adjusts the actual time duration of each said corresponding digital data stream segment in accordance with a timing adjustment signal from the operational support system.

41. A system as in claim 40, wherein said buffer circuit has an output data rate controlled in response to said timing adjustment signal.

42. A system as in claim 40, wherein said buffer circuit selectively adjusts a spacing between packets in said MPEG stream in accordance with said timing adjustment signal.

43. A system as in claim 40, wherein said buffer circuit adjusts said time duration in accordance with said timing adjustment signal and a buffer fullness ratio.

44. A system as in claim 40, wherein said correction circuit further comprises a timing restamp module replacing said PCR values in said MPEG stream with corrected PCR values in accordance with said timing adjustment signal.

45. A system as in claim 33, wherein said packet demultiplexer comprises an ATM input processor outputting said digital data stream from an ATM cell stream having a selected virtual path identifier.

46. A system as in claim 45, said monitors each further comprising an ATM output processor outputting a second ATM cell stream carrying a corrected digital data stream.

47. A system as in claim 33, wherein the operations support system initiates corrective measures if said detected jitter values exceed a predetermined threshold.

48. A system as in claim 47, wherein the operational support system comprises a router that reroutes traffic in the packet switched network in response to the detected jitter values.

49. A system as in claim 47, wherein said corrective measures include at least one of rerouting network traffic, performing maintenance on one of a plurality of network nodes, and correcting the detected jitter at the one node.

50. A system as in claim 33, wherein the operations support system comprises:

a routing processor assigning each of the data packet streams a virtual path through selected nodes of the packet switched network, the routing processor rerouting at least a portion of a group of data packet streams passing through one of said selected nodes in accordance with corresponding detected jitter values; and a network element management system for managing corrective action to be performed on said one selected node in accordance with said corresponding detected jitter values.

* * * * *